United States Patent [19]

Levien

[11] Patent Number: 4,730,501

[45] Date of Patent: Mar. 15, 1988

[54] SINGLE TUBE PARALLEL FLOW CORIOLIS MASS FLOW SENSOR

[75] Inventor: Andrew K. Levien, San Jose, Calif.

[73] Assignee: Exac Corporation, Campbell, Calif.

[21] Appl. No.: 864,595

[22] Filed: May 19, 1986

[51] Int. Cl.[4] .............................................. G01F 1/84
[52] U.S. Cl. ......................................................... 73/861.38
[58] Field of Search ........................ 73/861.37, 861.38

[56] References Cited

U.S. PATENT DOCUMENTS

| | | | |
|---|---|---|---|
| 4,311,054 | 1/1982 | Cox et al. | 73/861.38 |
| 4,491,025 | 1/1985 | Smith et al. | 73/861.38 |
| 4,622,858 | 11/1986 | Mizerait | 73/861.38 |
| 4,628,744 | 12/1986 | Lew | 73/861.38 |

FOREIGN PATENT DOCUMENTS 0119638  9/1984  European Pat. Off. ......... 73/861.38
0117416  7/1983  Japan .............................. 73/861.38

*Primary Examiner*—Herbert Goldstein
*Attorney, Agent, or Firm*—Claude A. S. Hamrick

[57] ABSTRACT

A single tube parallel flow Coriolis mass flow rate sensor including a single continuous tube folded upon itself in a generally elongated helically looped fashion so that a straight input segment of the loop is positioned in parallel to a straight output segment and the fluid flowing through the loop flows in the same direction in both segments. The extremities of the two straight segments are rigidly joined together and affixed to an enclosing housing. An oscillatory drive mechanism is coupled between the straight segments at their mid-points and a pair of sensing mechanisms are coupled between the tubes at points intermediate the respective ends and their mid-points.

21 Claims, 5 Drawing Figures

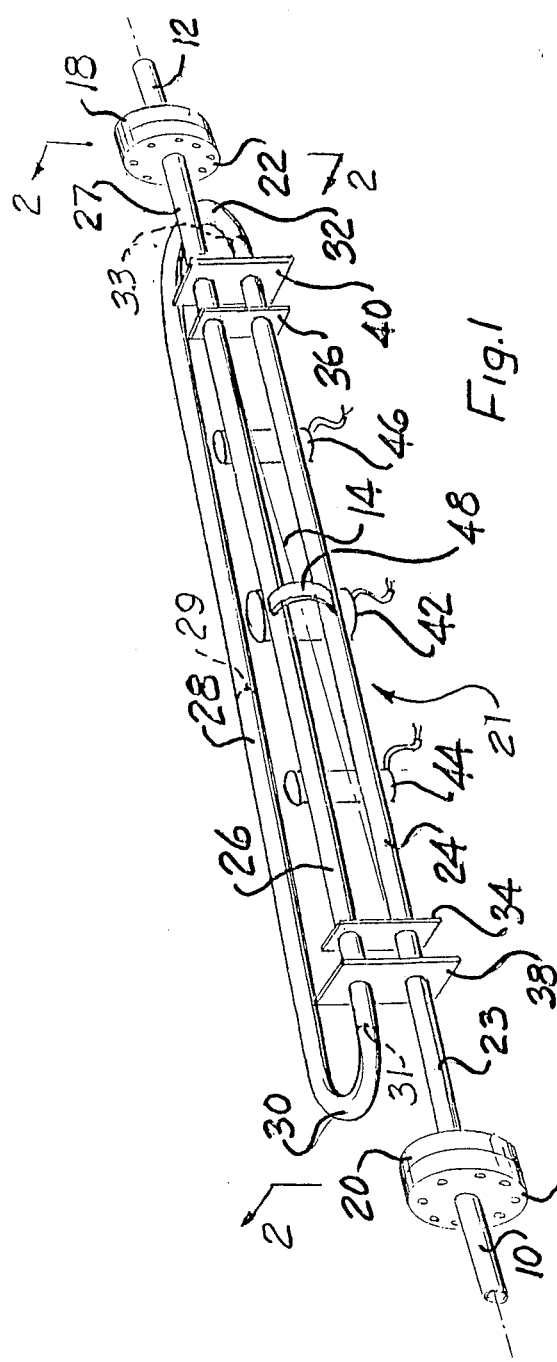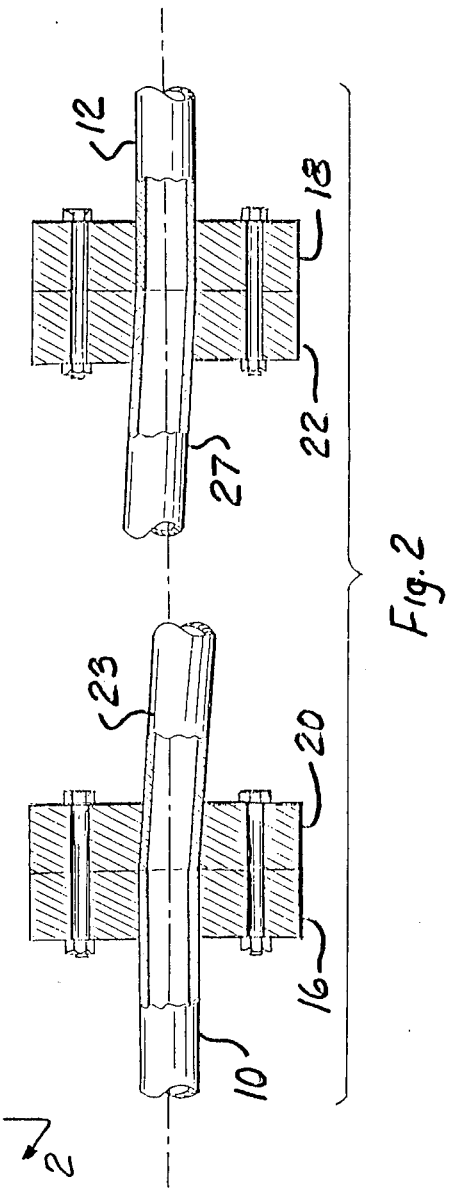

SINGLE TUBE PARALLEL FLOW CORIOLIS MASS FLOW SENSOR

BACKGROUND OF THE INVENTION

1. Field of the Invention

The present invention relates generally to Coriolis mass flow meters, and more particularly to a device comprised of two elongated straight tube segments extending in parallel with each other and joined together in such fashion that an inlet portion of a loop is formed by one tube segment and an outlet portion is formed by the other tube segment and such inlet and outlet portions form parallel Coriolis responsive legs of a parallel tube Coriolis mass flow sensor.

2. Discussion of the Prior Art

Straight tube Coriolis mass flow sensing apparatus has long been known in the prior art. For example, the U.S. Pat. Nos. to W. C. Wiley et al, No. 3,080,750 and A. J. Sipin, No. 3,329,019 provide early disclosure of single tube, straight tube Coriolis devices and provide technical arguments in explanation of the operation thereof. Briefly stated, in both devices the tube ends are fixed in position and the mid-point is driven is oscillatory fashion with a measure of the Coriolis induced forces being used to indicate mass flow rate. In Sipin, Coriolis induced phase difference is measured at points on either side of the tube mid-section and such phase difference (a function of Coriolis forces) is used to indicate mass flow rate.

A later disclosure of a straight tube device in which mass flow rate is measured by sampling Coriolis induced torque as the tube passes through a mid-line of oscillation is disclosed in U.S. Pat. No. 4,109,524 issued to James E. Smith.

It was also recognized by Roth, U.S. Pat. No. 2,865,201 and Sipin, U.S. Pat. No. 3,355,944 that a Coriolis mass flow sensor could be made by folding a tube into a U-shaped or looped form. The U-shaped design was modified in Smith U.S. Pat. Nos. 4,187,721 and 4,422,338 by adding a counterbalancing spring arm to the drive mechanism.

In Cox et al, U.S. Pat. No. 4,127,028 disclosed that by using a pair of U-tubes disposed in parallel and oscillating them in opposite directions, one could make differential measurements of Coriolis induced phase differences and at the same time, achieve the benefits of a "tuning fork" design having more favorable density response characteristics.

Further improvement in which generally one or more helically wound tubes are utilized are disclosed in the U.S. patent applications of Erik Dahlin, Ser. No. 775,739 filed Sept. 13, 1985, now U.S. Pat. No. 4,711,132 and Erik Dahlin et al, Ser. No. 777,707 filed Sept. 13, 1985, now U.S. Pat. No. 4,660,421 (both of which are assigned to the assignee of the present invention). Another flow meter apparatus in which two U-tubes are joined together by a manifold structure to split the flow and provide fluid flow through each conduit is disclosed in the U.S. patent of James E. Smith et al, U.S. Pat. No. 4,491,025. A flow meter using an S-shaped tube is disclosed in the U.S. patent to A. J. Sipin U.S. Pat. No. 4,559,833. The latter patent also discloses the use of two such S-shaped tubes disposed in parallel and in combination with appropriate flow splitters.

Although the above mentioned prior art devices are quite suitable for certain applications, one of the features of the split flow devices which adds to the complexity and cost thereof is the manifold structure that is required in order to split the flow into separate flow paths which can then be oscillated relative to each other to accomplish Coriolis mass flow detection. In addition to the physical complexity of the manifold structure, it also has the disadvantage that it requires the use of metallic junctions which are not suitable for applications in the food and pharmaceutical industry wherein very high degrees of contamination-free joint and conduit forming wall structures ie., ultra smooth surfaces, are required. Another problem encountered in split flow devices is that it can not be assured that phase separation will not occur in the fluid and result in a compromise of, or even loss of, the tuning fork effect normally expected in such devices.

SUMMARY OF THE PRESENT INVENTION

It is therefore an object of the present invention to provide a Coriolis mass flow rate sensing apparatus in which the active flow tube portions are straight tubes joined together in a manner that requires no tube discontinuity between inlet and outlet of the sensor.

Another object of the present invention is to provide a device of the tube described which can be fabricated of a single type of corrosion resistant material with no joints being required other than at the end fittings.

Still another object of the present invention is to provide a device of the type described in which no flow splitting is required.

Briefly, a preferred embodiment of the present invention includes a single continuous tube folded upon itself in a generally elongated helically looped fashion so that a straight input segment of the loop is positioned in parallel to a straight output segment and the fluid flowing through the loop flows in the same direction in both segments. The extremities of the two straight segments are rigidly joined together and affixed to an enclosing housing. An oscillatory drive mechanism is coupled between the straight segments at their mid-points and a pair of sensing mechanisms are coupled between the tubes at points intermediate the respective ends and their mid-points.

Among the advantages of the present invention is that the single flow tube structure eliminates the need for a flow manifold or welded tube joints within the flow sensor. As a consequence, cost is minimized due to the elimination of pressure welds and manifold structure. In addition, because the process fluid wets only tubing surfaces as it passes through the sensor, the device can be qualified for sanitary service in the food and pharmaceutical industries. Moreover, reliability and corrosion resistance is also enhanced due to the reduced number of welds required.

Another advantage of the present invention is that the present invention accomplishes considerable reduction in the complexity and thus the cost of the flow sensor, as compared to the prior art two-tube designs above, without compromising meter performance, and is realized by providing two vibrating segments of a single tube in counter-balancing configuration.

A still further advantage of the present invention, is that whereas prior art two-tube designs give rise to segregation of the phases in multiphase flows, where one phase will preferentially flow into one flow tube causing mass flow indication errors, such a condition does not arise in the single tube embodiment of the present invention.

These and other objects and advantages of the present invention will no doubt become apparent to those skilled in the art after having read the following detailed description of the preferred embodiments which are illustrated in the several figures of the drawing.

IN THE DRAWING

FIG. 1 is a simplified perspective view illustrating the characteristics of a Coriolis mass flow sensor in accordance with the present invention;

FIG. 2 is a two part illustration broken along the lines 2—2 in FIG. 1 to illustrate one embodiment of an end fitting structure;

DETAILED DESCRIPTION OF THE PREFERRED EMBODIMENTS

Figure 3:
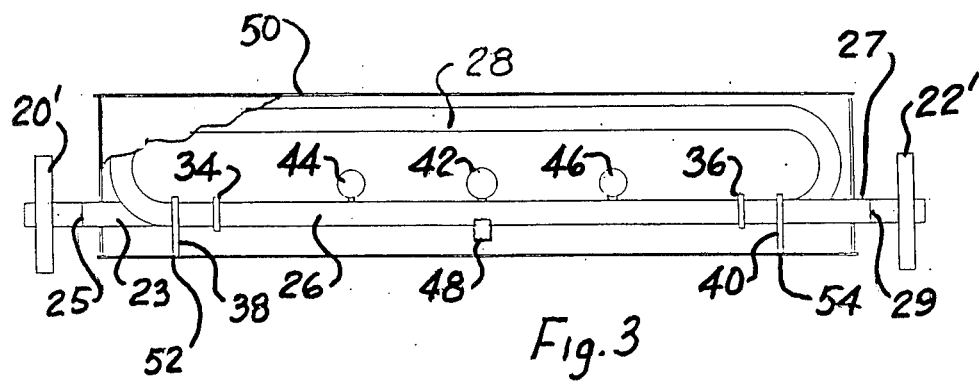
FIG. 3 is a top plan view of a sensor of the type depicted in FIG. 1, shown enclosed in a housing and having an alternative configuration of mounting flanges.

Referring now to FIG. 1 of the drawing, there are shown at 10 and 12 the spaced apart ends of a process pipeline extending along the center line 14 and terminating in mounting flanges in 16 and 18 respectively. Disposed between the flanges 16 and 18, and affixed thereto by circular flanges 20 and 22 respectively, is a representation of the operative portion of a flow sensor 21 in accordance with the present invention.

As illustrated, the sensor 21 includes a continuous length of tubing of uniform diameter having three straight segments 24, 26 and 28, which are all disposed to lie parallel to each other, and end portions 30 and 32 which couple together the straight segments 26 and 28, and 24 and 26 respectively. The distal ends of the extended portions 23 and 27 angularly intersect the end flanges 20 and 22 respectively, as will be more specifically described below.

Two plates 34 and 36 of sufficient mechanical rigidity to isolate induced vibrations in the tube segments 24 and 26 from the rest of the structures of the sensor and the external piping system are rigidly secured to the tube at points which define the length of the segments 24 and 26. Each may consist of a single thick plate, or of several individual plates of reduced thickness spaced apart along the length of the tube portions. Sufficiently rigid mechanical members 38 and 40 also connect the looped flow tube portions to each other and to an enclosure wall (not shown) in order to isolate process piping forces and moments from the flow tube itself.

Coupled to the mid-portions of the tube segments 24 and 26 is a means, shown generally at 42, for inducing vibration of the tube segments relative to each other and in a plane defined by the center lines of the tube segments. The means 42 may include any electrical, mechanical, or electromechanical means suitable for imparting equal and opposite acceleration forces to the respective tube segments 24 and 26. Various means for accomplishing such ends are disclosed in the above-referenced prior art patents.

Attached to the tube segments 24 and 26 at approximately the quarter points along their lengths are means shown generally at 44 and 46 for measuring relative motion between the tube segments at the quarter points. This relative motion can be measured in terms of "displacement", "velocity", or "acceleration" using well known appropriate types of sensors. (Note that although illustrated as being attached at the quarter points along the lengths of the straight tube segments, the sensors 44 and 46 could alternatively be positioned at any other suitable points therealong.)

As an optional feature of the present invention, a mechanical link, or resilient member, or spring 48 may also be attached between the tubes 24 and 26 at the drive points in order to modify the fundamental resonant frequency of the tube segments 24 and 26, so as to provide enhanced sensitivity to flow rate through dynamic mechanical amplification.

In FIG. 2 of the drawing, broken sections taken along the lines 2—2 in FIG. 1 are depicted to illustrate one example of how the flanges 20 and 22 might be related to the ends of the tube segments 23 and 27 respectively, in order to properly interface with the pipeline flanges 16 and 18. Note that as a result of the generally helical nature of the sensor, neither straight segment may lie parallel to the pipeline axis 14. In the illustrated embodiment, the angle of intersection of tube segments 23 and 27 with flanges 20 and 22 respectively, will be defined by the mechanical dimensions of the sensor. Flange plates 20 and 22 are bored at the appropriate angles, mated with the tube ends, and then secured thereto by welding, brazing or other appropriate attachment means. The faces of the flanges are then appropriately dressed to form a compression fit with the corresponding faces of the flanges 16 and 18. In some cases it may be appropriate to include resilient O-ring seals (not shown) or the like, as is well known in the art.

Figure 4:
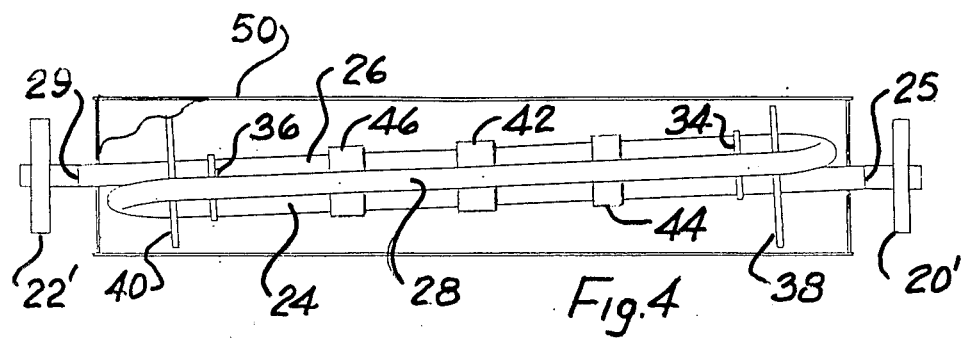
FIG. 4 is a side elevation of the embodiment shown in FIG. 3.

Turning now to FIGS. 3 and 4 of the drawing, a plan view and a side elevation respectively, including the above mentioned housing are shown broken away, and reveal the inter-relationship between sensor and housing 50. As previously alluded to, the plates 38 and 40 are rigidly affixed to housing 50 at 52 and 54. A different type of coupling treatment is also depicted in FIGS. 3 and 4, wherein instead of angularly intersecting the coupling flange plates, the tube end portions 23 and 27 are bent, or severed and reconnected, as indicated at 25 and 29 so that the junctions with the plates 20' and 22' are substantially normal to the face planes thereof. It should be noted that FIG. 4 is a view of FIG. 1 looking out of the plane of the paper and thus is reversed relative to the view shown in FIG. 3.

Figure 5:
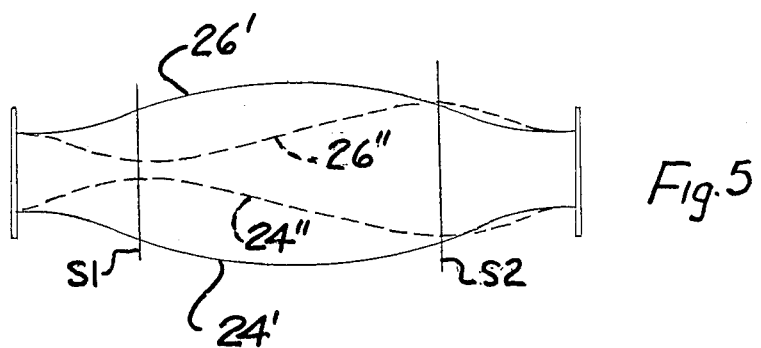
FIG. 5 is a schematic diagram illustrating vibration modes experienced by the tube segments during operation of the preferred embodiment.

In operation, with the device fully assembled and connected in a flow line, vibration is induced in the tube segments 24 and 26 at their fundamental resonant frequency by actuation of the device 42, which is attached to their drivepoints as previously described. Induced vibration is at the fundamental resonant frequency to minimize the required driving input. The shape of the deformed tube in greatly exaggerated form is illustrated schematically in FIG. 5 by the lines 24' and 26', and gives rise to angular velocities in the tube and fluid flowing therethrough. These angular velocities have vector directions perpendicular to the plane of the tube vibrations, i.e., into or out of the plane of the paper (as shown in FIGS. 4 and 5) and perpendicular to the velocity vector of the bulk fluid passing through the tube segments. These perpendicular vectors, along with the flowing fluid (and flowing mass), give rise to oscillating Coriolis forces acting in the plane of tube vibration.

Accordingly, the oscillating Coriolis forces excite the first harmonic vibration mode of the tubes (off resonance, ie., at the fundamental frequency) and cause deformation thereof as illustrated in one extreme by the dashed lines 24" and 26". The amplitude of such vibration is a function of the Coriolis forces and thus the mass flow rate present in the tubes. It can be shown that the superposition of the induced tube vibration in the fundamental mode and the Coriolis induced motion in the first harmonic mode gives rise to a phase shift in the relative motion wave forms as measured at S1 and S2 (FIG. 5). The mass flow rate is thus related to the phase shift by the following equation:

$$Q_m = (KY_T \tan \Delta\theta)/(Hf_0)$$

where
$Q_m$ is the mass flow rate,
K is a meter calibration constant,
$Y_T$ is the "spring constant" of the tube (dependent upon the tube temperature T)
$\Delta\theta$ is the phase shift between the relative motion measured at points S1 and S2,
H is the dynamic mechanical amplification factor $(1/[1-(f_0/f_1)^2]$ assuming negligible structural dampening.
$f_0$ is the fundamental resonant frequency, and
$f_1$ is the first harmonic resonant frequency.

It will thus be appreciated that the above described single flow tube embodiment eliminates the need for a flow manifold and welded tube joints within the confines of the sensor structure per se. This minimizes construction costs due to the elimination of pressure welds (except for process connections) and manifold castings. Also, because the process fluid wets only tubing surfaces as it passes through the sensor, the sensor can be qualified for sanitary service in the food and pharmaceutical industries.

Furthermore, reliability and corrosion resistance is also enhanced due to the reduced number of welds. The illustrated structure also results in a considerable reduction in the complexity and costs of the flow meter, as compared to prior art dual-tube designs, without compromising metering performance in that it uses a single piece of tubing but still retains the benefit of having two counterbalancing vibrating segments (24 and 26).

Moreover, whereas prior art split flow dual-tube designs give rise to segregation of the phases in multiphase flows, where one phase preferentially flows to one tube causing mass flow rate indication errors, such condition does not arise in the single tube embodiment of the present invention.

Although the present invention has been described in terms of certain preferred embodiments, it will be appreciated that certain alterations and modifications thereof will no doubt become apparent to those skilled in the art after having read the above disclosure. For example, for some applications it may be appropriate to couple the two tube segments 24 and 26 by means of a flexible hose joined to the segments 24 and 26 at 31 and 33 (FIG. 1) instead of the integral tube portion 28. Further more, instead of bending a single continuous tube into a loop, the loop may be formed of a pair of "J-shaped" members joined together as indicated by the dashed line 29 in FIG. 1. Similarly, instead of the sensors 44 and 46 one might apply strain gauges or the like to the plates 34 and 36. It is therefore intended that the following claims be interpreted to cover all such alterations and modifications as fall within the true spirit and scope of the invention.

What is claimed is:
1. A Coriolis mass flow rate sensor comprising:
a single, continuous tubular conduit formed in a single loop configuration including first and second elongated straight portions which are joined together by a connecting portion, such that said first and second straight portions are mutually parallel and flow through said conduit passes through said first and second straight portions in the same direction;
first and second vibration isolation plate means disposed near respective opposite ends of said straight portions, said isolation plate means being soley supported by, and rigidly connecting together, adjacent ends of said straight portions to define a pair of elongated straight sensor segments which have a shorter length than said connecting portion;
drive means coupled to drive points located midway along the lengths of said sensor segments to apply substantially equal but oppositely directed oscillatory forces thereto; and
sensing means coupled between said sensor segments at sensing points located on opposite sides of said drive points to sense relative motion between the sensing points of said segments and to develop corresponding output signals.

2. A Coriolis mass flow rate sensor as recited in claim 1 and further comprising housing means enveloping said conduit and having end walls through which distal ends of said first and second straight portions pass.

3. A Coriolis mass flow rate sensor as recited in claim 2 wherein the said distal ends of said conduit include attachment means adapted to mate with and be connected to a pipeline.

4. A Coriolis mass flow rate sensor as recited in claim 1 and further comprising resilient means coupling the drive points of said pair of straight sensor segments together, said resilient means being operative to influence the vibratory characteristics of said sensor segments.

5. A Coriolis mass flow rate sensor as recited in claim 1 wherein said connecting portion includes a first curved segment, an elongated linear segment, and a second curved segment, and wherein said linear segment is parallel to said first and second straight segments.

6. In a Coriolis mass flow rate measuring apparatus including a mass flow rate sensor for in-line connection in a flow stream, means for applying actuating power to the sensor to cause it to generate Coriolis force related output signals, and means for receiving and processing said output signals to develop mass flow rate information, an improved mass flow rate sensor, comprising:
a single continuous tubular conduit formed in a single loop configuration having adjacent parallel first and second elongated straight portions joined together by a connecting portion such that flow through said conduit passes in the same direction through said first and second straight portions;
vibration isolation plate means solely supported by, and rigidly connecting together, adjacent ends of said first and second straight portions to define between said plate means a pair of elongated sensor segments which are shorter than said connecting portion and to define outside said plate means a pair of distal ends of said straight portions;
drive means coupled to drive points located midway along the lengths of said sensor segments to apply substantially equal but oppositely directed oscillatory forces thereto; and sensing means coupled between said sensor segments at sensing points located on opposite sides of said drive points to sense relative motion between said sensor segments and develop said output signals.

7. An improved mass flow rate sensor as recited in claim 6 and further comprising housing means enveloping said conduit and having end walls through which pass said distal ends.

8. An improved mass flow rate sensor as recited in claim 7 wherein said distal ends are fitted with attachment means adapted to mate with and be connected to a pipeline.

9. An improved mass flow rate sensor as recited in claim 6 and further comprising resilient means coupling together the drive points of said first and second straight portions, said resilient means being operative to influence the vibratory characteristics of said sensor segments.

10. An improved mass flow rate sensor as recited in claim 6 wherein said connecting portion includes a first curved segment, an elongated linear segment, and a second curved segment, and wherein said linear segment lies parallel to said segments.

11. A Coriolis mass flow rate sensor comprising:
a tubular conduit configured as a single loop including elongated first and second straight members in adjacent parallel relationship and joined together by a curved connecting member such that flow through said conduit passes in the same direction through said first and second straight members;

first and second vibration isolation plate means solely supported by, and rigidly connecting together, adjacent ends of said first and second straight members to define between said plate means a pair of elongated sensor segments and to define outside said plate means said connecting member with a length longer than said straight members;

drive means coupled to drive points located midway along the lengths of said sensor segments to apply substantially equal but oppositely directed oscillatory forces thereto; and sensing means coupled between said sensor segments at sensing points located on opposite sides of said drive points to sense relative motion between said segments and develop corresponding output signals.

12. A Coriolis mass flow rate sensor as recited in claim 11 and further comprising housing means enveloping said conduit and having end walls through which pass distal ends of said first and second straight members.

13. A Coriolis mass flow rate sensor as recited in claim 12 wherein said distal ends include attachment means adapted to mate with and be connected in line to a pipeline.

14. A Coriolis mass flow rate sensor as recited in claim 11 and further comprising resilient means coupling together the drive points of said first and second straight segments and being operative to influence the vibratory characteristics of said sensor segments.

15. A Coriolis mass flow rate sensor as recited in claim 11 wherein said connecting member includes a first semi-circular segment, an elongated linear segment, and a second semi-circular segment, and wherein said linear segment lies parallel to said first and second sensor segments.

16. A Coriolis mass flow rate sensor as recited in claim 11 wherein said connecting member is made of a different material than that of said first and second straight members.

17. A Coriolis mass flow rate sensor as recitedd in claim 11 wherein said sensing means are velocity sensors for developing output signals for calculating a mass flow rate $Q_m$ according to the formula $$Q_M = (KY_T \tan \Delta\theta)/Hf_0)$$

where
K is a meter calibration constant;
$Y_T$ is the "spring constant" of the tube (dependent upon the tube temperature T);
$\Delta\theta$ is the phase shift between the relative motion measured at the sensing points;
H is the dynamic mechanical amplification factor $1/[1-(f_0f_1)^2]$ assuming negligible structural dampening;
$f_0$ is the fundamental resonat frequency; and
$f_1$ is the first harmonic resonant frequency.

18. A Coriolis mass flow rate sensor comprising:
a tubular conduit configured as a single loop including a first J-shaped member having an elongated straight first portion and a second portion at least a part of which is curved, and a second J-shaped member having an elongated straight third portion and a fourth portion at least a part of which is curved, the distal ends of said second and fourth portions being joined together such that said first and third portions are disposed in adjacent parallel relationship to each other;

vibration isolation plate means solely supported by, and rigidly connecting together, adjacent ends of said first and third portions to define a pair of elongated straight sensor segments and to define said second and fourth portions as a connecting portion longer than said sensor segments;

means coupled to drive points located midway along the lengths of said sensor segments to apply thereto substantially equal but oppositely directed oscillatory forces; and sensing means coupled between said sensor segments at sensing points located on opposite sides of said drive points to sense relative motion between said sensor segments and develop corresponding output signals.

19. A Coriolis mass flow rate sensor as recited in claim 18 and further comprising housing means enveloping said conduit and having end walls through which pass distal ends of said first and third portions.

20. A Coriolis mass flow rate sensor as recited in claim 19 wherein said distal ends include attachment means adapted to mate with and be connected to and in line with a pipeline.

21. A Coriolis mass flow rate sensor as recited in claim 20 and further comprising resilient means coupling together the drive points of said first and second segments, said resilient means being operative to influence the vibratory characterstics of said sensor.

* * * * *